(12) United States Patent
Tank et al.

(10) Patent No.: US 6,401,531 B1
(45) Date of Patent: Jun. 11, 2002

(54) AIR FLOW METER HAVING FLOW RECTIFIER WITH LATTICE IN FIXED CONFIGURATION

(75) Inventors: Dieter Tank, Kornwestheim; Holger Pfeiffer, Ludwigsburg; Markus Sippel, Schwieberdingen; Horst Kubitz, Steinheim/Murr., all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,047

(22) PCT Filed: Mar. 24, 1999

(86) PCT No.: PCT/DE99/00866

§ 371 (c)(1),
(2), (4) Date: Jun. 6, 2000

(87) PCT Pub. No.: WO99/67601

PCT Pub. Date: Dec. 29, 1999

(30) Foreign Application Priority Data

Jun. 19, 1998 (DE) .......................................... 198 27 375

(51) Int. Cl.[7] ................................................. G01F 1/68
(52) U.S. Cl. ................................... 73/204.21; 73/202.5

(58) Field of Search ......................... 73/204.21, 204.18, 73/202.5, 202, 118.5

(56) References Cited

U.S. PATENT DOCUMENTS 4,127,029 A * 11/1978 Murtin ......................... 73/194
5,253,517 A * 10/1993 Molin et al. ............... 73/118.2

* cited by examiner

Primary Examiner—Benjamin R. Fuller
Assistant Examiner—Corey D. Mack
(74) Attorney, Agent, or Firm—Ronald E. Greigg

(57) ABSTRACT

A device for measuring the mass of a flowing medium has a measuring element disposed in a measurement fitting. A flow rectifier that is provided upstream of the measuring element has flow openings that are separated from one another by intermediary pieces. A wire lattice is fastened to a tube of the flow rectifier extending in the direction of the measuring element. The tube of the flow rectifier has a number of fixing elements disposed offset from one another at a predetermined distance in which wires of the wire lattice are secured so that the wire lattice has a fixed configuration in relation to the intermediary pieces of the flow openings of the flow rectifier.

20 Claims, 3 Drawing Sheets

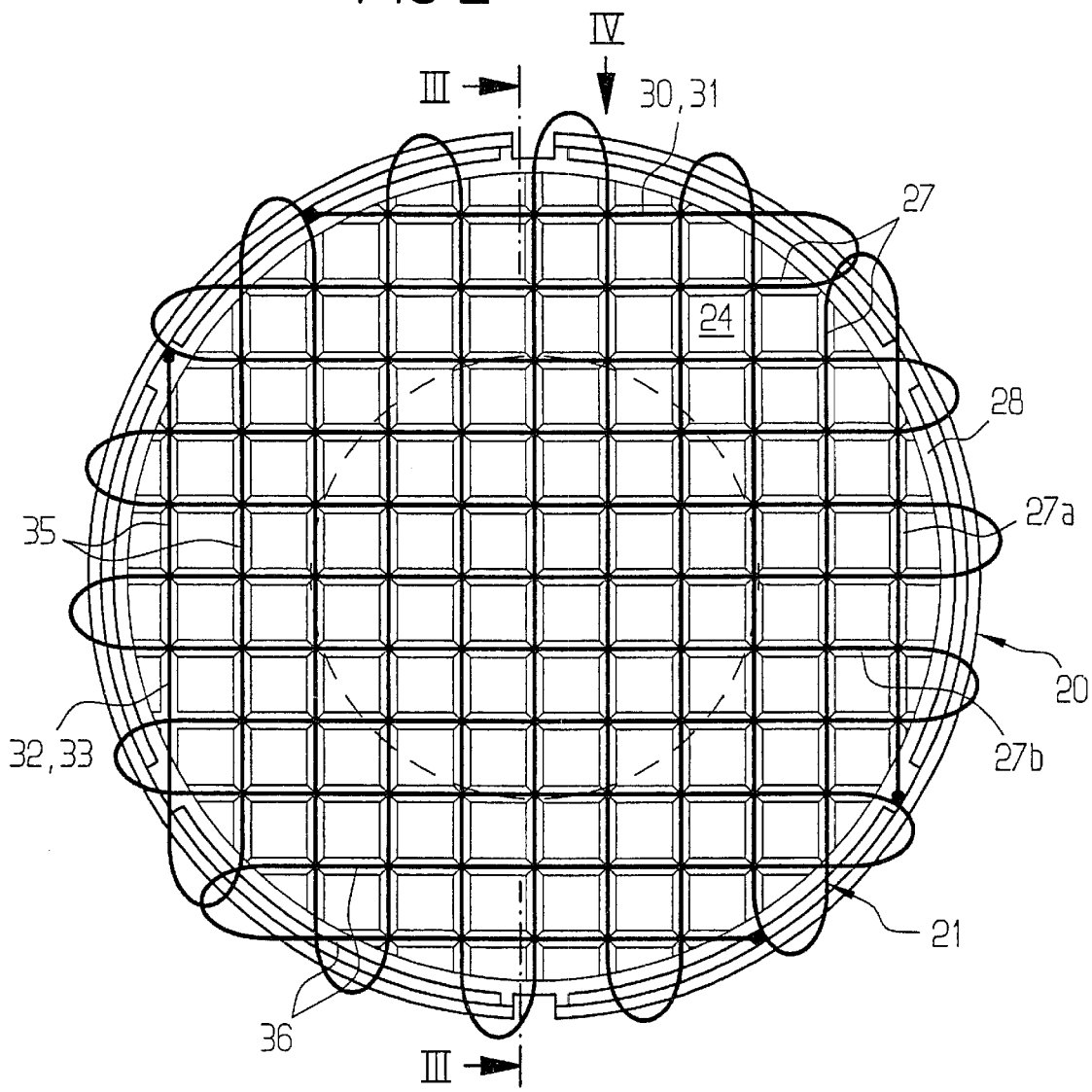

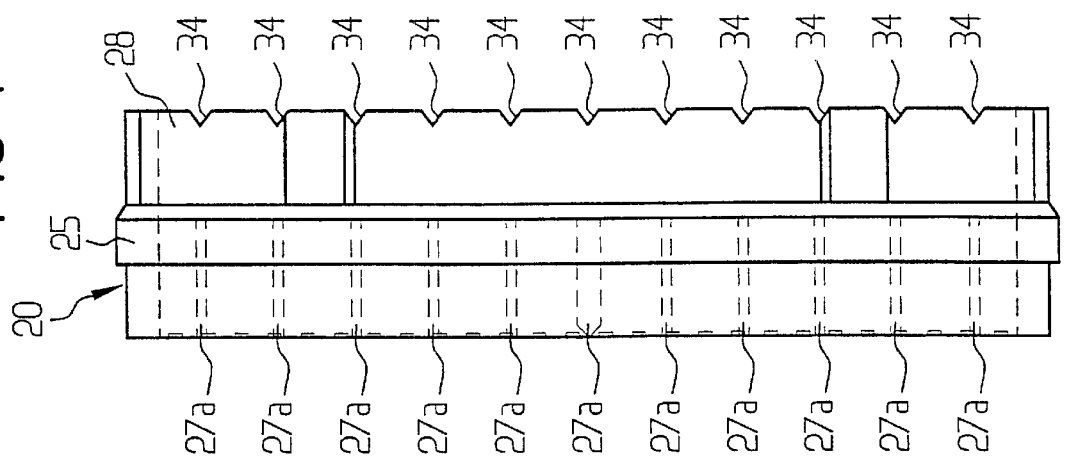
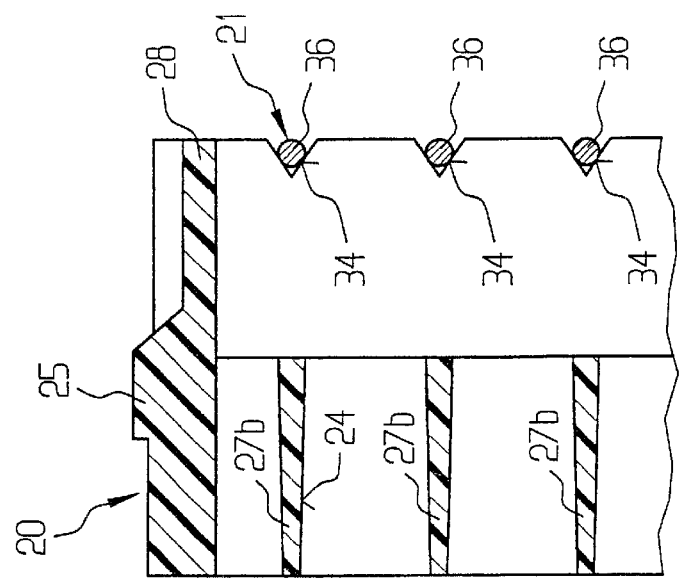

AIR FLOW METER HAVING FLOW RECTIFIER WITH LATTICE IN FIXED CONFIGURATION

PRIOR ART

The invention is based on a device for measuring the mass of a flowing medium.

A device for measuring the mass of a flowing medium has already been disclosed by EP 0 458 998 B1, which has a measuring element accommodated in a measurement fitting, wherein a flow rectifier and a lattice are accommodated upstream of the measuring element. The flow rectifier is provided in order to generate a flow that is as uniform as possible over the entire inner cross-section of the measurement fitting. To this end, the flow rectifier has a number of flow openings arranged in honeycomb fashion, which are separated from one another by intermediary pieces. The lattice attached to a tube of the flow rectifier that extends in the direction toward the measuring element is intended to produce extremely fine turbulence in the flow in order to produce the most uniform possible flow conditions downstream of the lattice and to produce a stabilization of the measurement signal of the measuring element.

In order to prevent a scattering of the characteristic curve of the measurement signal emitted by the measuring element, it is particularly important to place the lattice in a precise, defined alignment in relation to the flow rectifier.

Even slight variations in the disposition of the lattice in relation to the flow rectifier produces a variation of the characteristic curve of the individual devices produced in a series production. A calibration of the measurement signal is therefore only possible with a corresponding imprecision.

The lattice in EP 0 458 998 B1 is a wire lattice which has individual wires that are woven with one another into a lattice structure. The wire lattice is stamped out of a broad mesh grid in accordance with the opening cross-section of the measurement fitting and is then inserted into the tube of the flow rectifier. When the wire lattice is stamped out of the broad mesh grid, it is impossible to prevent the wires, which are no longer securely fixed after the stamping, from moving until the final fixing in the tube of the flow rectifier, since the wires are only loosely held in the wire fabric after being stamped out of the broad mesh grid. Furthermore, the stamping at least partially eliminates the ability, which exists in the broad mesh grid, of the individual wires to brace each other, which likewise lead to a changed alignment of individual wires within the lattice structure. The wire lattice, whose individual wires that are not securely fixed, is subsequently inserted into the plastic of the tube through the heating of the tube's plastic material. In this process step as well, a movement of the individual wires in relation to one another cannot be prevented. The individual wires of the lattice structure are therefore not fixed with the required precision in the tube of the flow rectifier so that there is a certain inevitable scattering of the characteristic curve of devices that are produced with a high degree of automation in a series production. As described above, this reduces the measurement precision of the device.

ADVANTAGES OF THE INVENTION

The device according to the invention for measuring the mass of a flowing medium, has the advantage over the prior art that the wires of the wire lattice are fixed with high precision to the tube of the flow rectifier by means of the fixing elements provided. The configuration of the wire lattice is therefore aligned with a high degree of precision in relation to the intermediary pieces of the flow rectifier, wherein a higher reproduction precision can be achieved in a highly automated manufacturing, and consequently, only a slight, practically negligible characteristic curve scattering occurs. The individual flow openings formed between the wires of the wire lattice are therefore aligned with a high degree of precision in relation to the intermediary pieces of the flow rectifier. The function of the wire lattice, namely the production of extremely fine turbulence, is maintained.

Advantageous improvements and updates of the device are possible by means of measures taken.

Advantageously, the wire lattice can be comprised of two independent layers that are not woven together, which is particularly simple from a production engineering standpoint. A first layer of the wire lattice is preferably comprised of a continuous wire and a second layer, likewise comprised of a continuous wire, is placed over the first layer in a different direction, for example orthogonally. The lattice structure is thereby produced directly by means of the fastening of the wires to the tube of the flow rectifier and it is no longer necessary to stamp the wire lattice out of a broad mesh grid.

It is also possible to dispose the wire lattice at a predetermined angle in relation to the intermediary pieces of the flow rectifier. In a particularly advantageous manner, it is possible to vary the mesh width of the wire lattice over the diameter by virtue of the fact that the fixing elements are not disposed equidistantly, but with variable spacing in the two directional dimensions of the wire lattice. This is fundamentally impossible with the previously known stamping of a wire lattice out of a prefabricated broad mesh grid. However, it is also possible to associate each intermediary piece of the flow rectifier exactly with a wire section of the wire lattice, which is disposed offset in the flow direction parallel to the associated intermediary piece with a high degree of precision that is predetermined by means of the fixing elements.

It is advantageous to warm-caulk the wires of the wire lattice to the tube since this only requires a low manufacturing cost.

BRIEF DESCRIPTION OF THE DRAWINGS

An exemplary embodiment of the invention is shown in a simplified form in the drawings and will be explained in detail in the description that follows.

FIG. 2 is a front view of a flow rectifier used in the device according to the invention and a wire lattice that is likewise used;

FIG. 3 shows an expressly enlarged depiction of a section through the flow rectifier shown in FIG. 2 and of the wire lattice shown in FIG. 2 along the line III—III in FIG. 2; and FIG. 4 is a top view of the flow rectifier shown in FIG. 2.

DESCRIPTION OF THE EXEMPLARY EMBODIMENT

Figure 1:
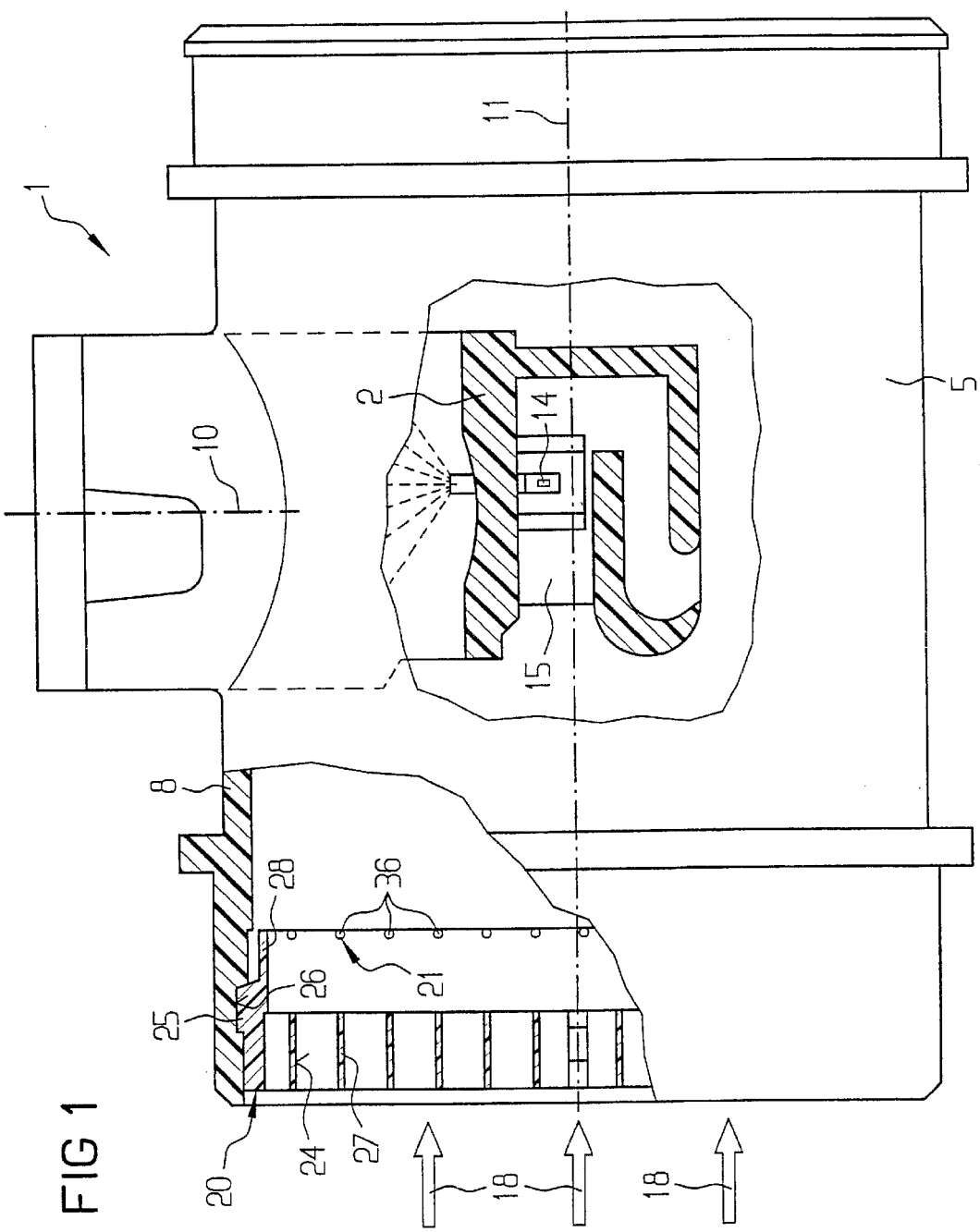
FIG. 1 is a partially sectional depiction of a device according to the invention.

FIG. 1 shows a partially sectional depiction of a device 1 for measuring the mass of a flowing medium, in particular the intake air mass of internal combustion engines. The internal combustion engine can be a mixture-compressing engine with externally supplied ignition or also an air-compressing engine with self ignition. The device 1 has a measuring part 2, which is inserted, for example in a pluggable fashion, into a measurement fitting 5 of the device 1. The measuring part 2 has, for example, a slender, rodshaped, block-like form that extends longitudinally in the direction of a plugging axis 10 and is inserted, for example in a pluggable fashion, into an opening that is let into a wall 8 of the measurement fitting 5. The wall 8 defines a flow cross section which has a circular or cross-section, for example, in the center of which a center axis 11 extends in the flow direction 18 of the flowing medium, parallel to the wall 8, and this axis is oriented perpendicular to the plugging axis 8. The flow direction of the flowing medium is indicated in FIG. 1 by means of corresponding arrows 18 and in this instance travels from left to right.

A measuring element 14 is introduced along with the measuring part 2 into the flowing medium. A measurement conduit 15 is embodied in the measuring part 2 of the device 1 and the measuring element 14 for measuring the medium flowing in the measurement fitting 5 is accommodated in this measurement conduit. The design of such a measuring part 2 with a measuring element 14 is sufficiently known to one skilled in the art, for example, from DE 44 07 209 A1, whose disclosure is a component of the current patent application.

A sleeve-shaped flow rectifier 20 and a wire lattice 21 are provided upstream of the measuring element 14. The flow rectifier 20 is preferably comprised of plastic, is produced for example by means of injection molding, and has a large number of flow openings 24 that extend in the flow direction 18 and are for example square.

The flow rectifier 20 is inserted into the measurement fitting 5 on the inside of the wall 8, wherein an external projection 25 of the flow rectifier engages in detent fashion in a groove 26 provided on the inside of the wall 8. While the flow openings 24, which are separated from one another by intermediary pieces 27 extending over approximately half the axial length of the flow rectifier 20, are provided in the region of the flow rectifier 20 oriented in the flow direction 18, the flow rectifier 20 has a tube portion 28, which extends in the direction toward the measuring element 14, on its side oriented away from the flow direction 18. Wires or wire sections 36 of the wire lattice 21 are secured to the tube 28 in a manner that will be described in more detail below.

FIG. 2 shows a front view of the flow rectifier 20 with the wire lattice 21, with a direct view of the wire lattice 21 for the purpose of describing the flow rectifier 20 and the wire lattice 21 in more detail. FIG. 2 shows the tube 28 and the intermediary pieces 27 of the flow rectifier 20. In the exemplary embodiment described here, the flow openings 24 of the flow rectifier 20 are embodied in a square honeycomb fashion by virtue of the fact that intermediary pieces 27a that are vertical in FIG. 2 orthogonally intersect with intermediary pieces 27b that are horizontal in FIG. 2. However, it is also possible to embody the flow openings 24 of the flow rectifier 20 in a different manner, e.g. as hexagonal flow openings or round flow openings, wherein the intermediary pieces 27 must then be correspondingly modified.

As can be seen from FIG. 2, the wire lattice 21 is comprised of a first layer 30, which is constituted by a first continuous wire 31, and a second layer 32, which is constituted by a second continuous wire 33. The second layer 32 of the wire lattice 21 is disposed immediately downstream of the first layer 30 of the wire lattice 21 in the flow direction 18. The wire 31 of the first layer 30 is guided by means of fixing elements 34, which are not visible in FIG. 2 and will be described in more detail in conjunction with FIGS. 3 and 4, in such a way that first wire sections 36 extending in the tube 28 are aligned parallel to one another, horizontally in FIG. 2. Correspondingly, the second wire 33 of the second layer 32 is guided by means of corresponding fixing elements 34 so that second wire sections 35 extending in the tube 28 are aligned parallel to one another, vertically in FIG. 2. To that end, the wires 31 and 33 are guided in repeated S-curves by means of the fixing elements 34 so that the lattice structure shown in FIG. 2 is produced. The lattice structure is produced directly by means of the attachment of the wires 31 and 33 to the tube 28. A prefabrication of a broad mesh grid from which the wire lattice 21 is stamped out of as in the prior art is no longer necessary.

In the exemplary embodiment shown in FIG. 2, each horizontal intermediary piece 27b of the flow rectifier 20 is associated with a horizontal wire section 36, which is disposed offset in the flow direction 18 and parallel to the associated intermediary, piece 27b. Correspondingly, each vertical intermediary piece 27a of the flow rectifier 20 is associated with a vertical wire section 35 of the wire lattice 21, which is disposed offset in the flow direction 18 and parallel to the associated intermediary piece 27a. The fixing elements 34, which wild be described in more detail below, permit a highly precise alignment of the wire sections 35 and 36 in relation to the intermediary pieces 27a and 27b of the flow rectifier 20. Whereas with a wire lattice 21 that is stamped out of a broad mesh grid in accordance with the prior art, the wire sections 36, 35 can slip when the stamped-out wire lattice 21 is moved and inserted into the tube 28 and can also change position as a result of the at least partial release of tension of the mesh grid due to the stamping process, with the device according to the invention, a precise alignment of the wire sections 36, 35 is assured. This is achieved by the fixing elements 34 which can be seen in FIGS. 3 and 4.

FIG. 3 shows a section along the line III—III in FIG. 2, while FIG. 4 shows a top view of the flow rectifier 20 shown in FIG. 2, without the wire lattice 21. Elements which have already been described are provided with corresponding reference numerals in all of the FIGS. As shown in FIG. 3, the wire sections 36 of the wire 31 of the first layer 30 of the wire lattice 21 are secured in fixing elements 34, which are embodied by means of wedge-shaped slots. In this connection, each fixing element 34 is respectively associated with a horizontal lattice segment 27b. Naturally, the fixing elements can also assume other embodiment forms, e.g. pin-like projections or other raised areas as well as bores or the like. The essential thing is that the wire lattice 21 is clearly and reproducibly fixed in relation to the lattice segments 27 of the flow rectifier 20.

FIG. 4 is a top view in direction IV in FIG. 2, shows the position of the vertical intermediary pieces 27a of the flow rectifier 20. Furthermore, FIG. 4 also shows that each vertical intermediary piece 27a is likewise associated with a fixing element 34 in the form of a wedge-shaped or V-shaped groove. The wire lattice 21 is therefore fixed exactly in relation to the lattice segments 27. The final fastening of the wire lattice 21 can be produced, for example, by means of warm-caulking, by virtue of the fact that the tube 28 comprised of plastic is heated and pressed against a suitable counter surface so that the wires 31 and 33 are securely and permanently fixed in the fixing elements 34.

Naturally, it is also alternatively possible to embody the wire sections 36 and 35 as individual wires and not out of a continuous wire 31, 33 and to affix them to the fixing elements 34 as individual wires. Fundamentally, it is also possible to embody the wire lattice 21 as a woven wire lattice; however, this requires a higher manufacturing cost and is not absolutely necessary in view of the goal to be achieved, namely the production of extremely fine turbulence in the flow.

By means of a correspondingly changed embodiment of the fixing elements 34, the wire lattice 21 can also be disposed so that the wire lattice is rotated by a particular rotation angle in relation to the lattice segments 27 of the flow rectifier 20 if this has technical flow advantages. Furthermore, varying the vertical and horizontal distance between the fixing elements 34 can also achieve the fact that the mesh width of the wire lattice 21 is varied over the diameter of the wire lattice 21. For example, it can be advantageous to embody the wire lattice 21 as narrow-meshed in the vicinity of the center axis 11 in order to produce the finest possible turbulence in the vicinity of the measuring element 44 disposed there. In the regions disposed further out and adjacent to the wall 8, it can be conversely advantageous to provide as large a mesh width as possible for the wire lattice 21 in order to reduce the flow resistance which the wire lattice 21 presents to the flowing medium.

The foregoing relates to a preferred exemplary embodiments of the invention, it being understood that other variants and embodiments thereof are possible within the spirit and scope of the invention, the latter being defined by the appended claims.

We claim:

1. A device (1) for measuring the mass of a flowing medium, comprising a measuring element (14) disposed in a measurement fitting (5), a flow rectifier (20) that is provided upstream of the measuring element (14), said flow rectifier has flow openings (24) that are separated from one another by means of intermediary pieces (27), and a wire lattice (21), which is fastened to a tube portion (28) of the flow rectifier (20), said wire lattice extends in a direction of the measuring element (14), the tube (28) of the flow rectifier (20) has a number of equally spaced vertical and horizontal fixing elements (34) disposed relative to one another at a predetermined distance which are confined within an end of the tube (28) in which wires (31, 33) of the wire lattice (21) are secured so that the wire lattice (21) has a fixed configuration in relation to the intermediary pieces (27) of the flow openings (24) of the flow rectifier (20).

2. The device according to claim 1, in which the fixing elements are selected from a group consisting of slots (34), projections, or bores provided on the tube (28).

3. The device according to claim 1, in which a first layer (30) of the wire lattice (21) is aligned in a first direction and a second layer (32) of the wire lattice (21), which is disposed downstream of the first layer (30) in the flow direction (18), is aligned in a second direction.

4. The device according to claim 2, in which a first layer (30) of the wire lattice (21) is aligned in a first direction and a second layer (32) of the wire lattice (21), which is disposed downstream of the first layer (30) in the flow direction (18), is aligned in a second direction.

5. The device according to claim 3, in which the first layer (30) and the second layer (32) of a wire lattice (21) are each embodied by means of a continuous wire (31, 33), which is guided by means of the fixing elements (34) so that wire sections (34, 35) of the continuous wire (31, 33) of each particular layer (30, 32) of the wire lattice (21) extending in the tube (28) are respectively aligned parallel to one another.

6. The device according to claim 4, in which the first layer (30) and the second layer (32) of a wire lattice (21) are each embodied by means of a continuous wire (31, 33), which is guided by means of the fixing elements (34) so that wire sections (34, 35) of the continuous wire (31, 33) of each particular layer (30, 32) of the wire lattice (21) extending in the tube (28) are respectively aligned parallel to one another.

7. The device according to claim 5, in which each intermediary piece (27) of the flow rectifier (20) is associated with one or a number of wire sections (34, 35) of the wire lattice (21), which are disposed offset in the flow direction (18) and parallel to the associated intermediary piece (27).

8. The device according to claim 6, in which each intermediary piece (27) of the flow rectifier (20) is associated with one or a number of wire sections (34, 35) of the wire lattice (21), which are disposed offset in the flow direction (18) and parallel to the associated intermediary piece (27).

9. The device according to claim 1, in which the wire lattice (21) is disposed rotated by a predetermined angle in relation to the intermediary pieces (27) of the flow rectifier (20).

10. The device according to claim 2, in which the wire lattice (21) is disposed rotated by a predetermined angle in relation to the intermediary pieces (27) of the flow rectifier (20).

11. The device according to claim 3, in which the wire lattice (21) is disposed rotated by a predetermined angle in relation to the intermediary pieces (27) of the flow rectifier (20).

12. The device according to claim 5, in which the wire lattice (21) is disposed rotated by a predetermined angle in relation to the intermediary pieces (27) of the flow rectifier (20).

13. The device according to claim 1, in which the fixing elements (34) are disposed so that the mesh width of the wire lattice (21) varies over the diameter of the wire lattice (21).

14. The device according to claim 2, in which the fixing elements (34) are disposed so that the mesh width of the wire lattice (21) varies over the diameter of the wire lattice (21).

15. The device according to claim 3, in which the fixing elements (34) are disposed so that the mesh width of the wire lattice (21) varies over the diameter of the wire lattice (21).

16. The device according to claim 5, in which the fixing elements (34) are disposed so that the mesh width of the wire lattice (21) varies over the diameter of the wire lattice (21).

17. The device according to claim 9, in which the fixing elements (34) are disposed so that the mesh width of the wire lattice (21) varies over the diameter of the wire lattice (21).

18. The device according to claim 1, in which the wires (31, 33) of the wire lattice (21) are warm-caulked with the tube (28).

19. The device according to claim 2, in which the wires (31, 33) of the wire lattice (21) are warm-caulked with the tube (28).

20. The device according to claim 3, in which the wires (31, 33) of the wire lattice (21) are warm-caulked with the tube (28).

* * * * *